March 4, 1952 H. B. KING 2,587,628
LOAD STROKE INDICATOR
Filed Jan. 24, 1949 2 SHEETS—SHEET 1

INVENTOR.
HAROLD B. KING
BY Wade Knouty
James S. Shannon
ATTORNEYS

March 4, 1952     H. B. KING     2,587,628
LOAD STROKE INDICATOR
Filed Jan. 24, 1949     2 SHEETS—SHEET 2
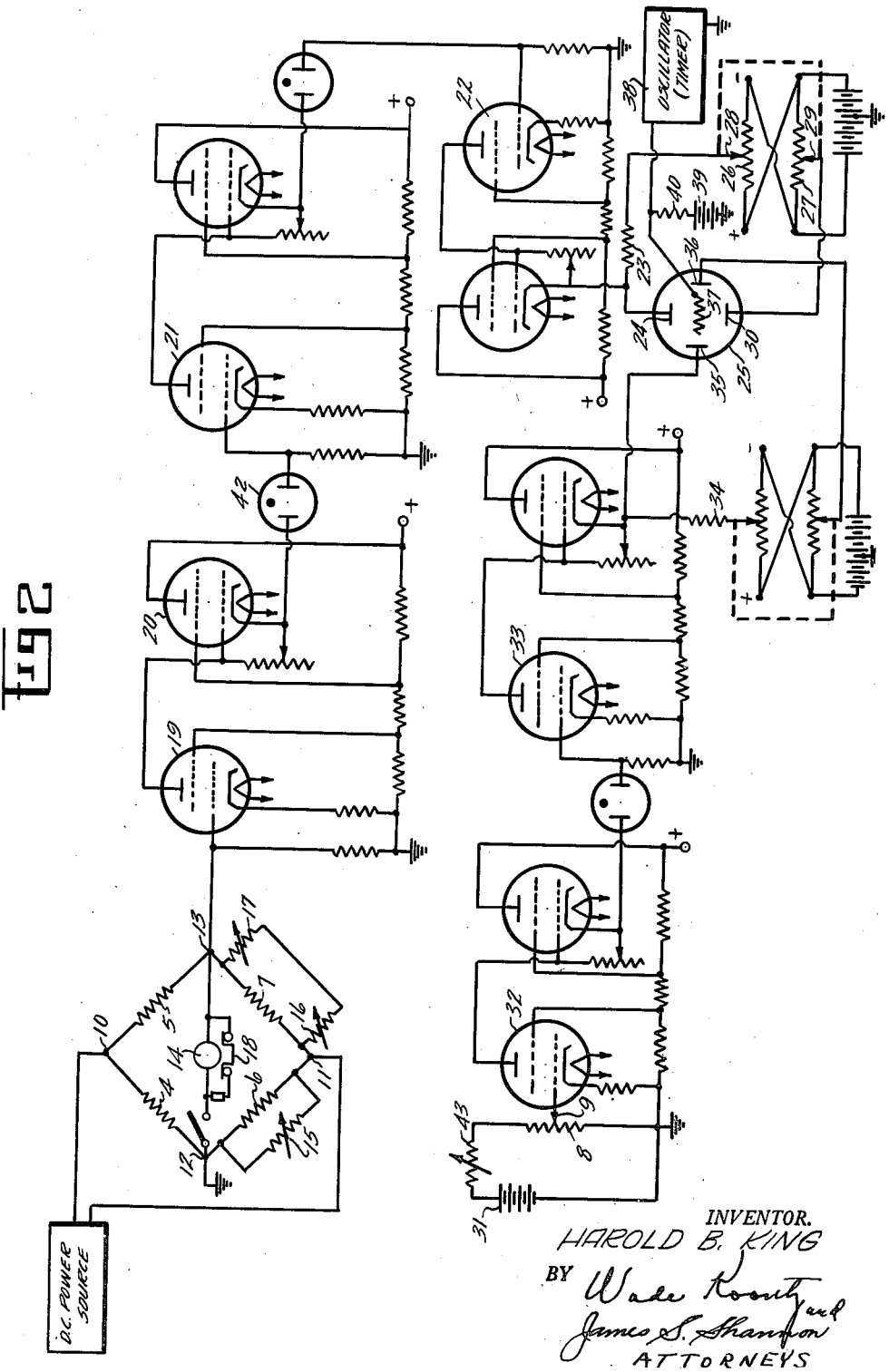
INVENTOR.
HAROLD B. KING Patented Mar. 4, 1952

2,587,628

UNITED STATES PATENT OFFICE 2,587,628

LOAD STROKE INDICATOR

Harold B. King, Dayton, Ohio

Application January 24, 1949, Serial No. 72,465

2 Claims. (Cl. 73—11)

(Granted under the act of March 3, 1883, as amended April 30, 1928; 370 O. G. 757)

The invention described herein may be manufactured and used by or for the Government for governmental purposes without payment to me of any royalty thereon.

This invention relates to apparatus for testing yieldable load carrying structures such, for example, as the landing gear of aircraft.

A landing gear unit usually consists of a strut rigidly attached to the body of the aircraft and a wheel structure yieldably attached to the rigid strut, with the yield in the gear being provided by an air cushioned hydraulic shock absorber. The stress in such a unit is a function of the portion of the total mass of the aircraft acting on the unit and the rate of deceleration of this mass. In the design and testing of such a gear it is therefore desirable to know the stress in the structure for all degrees of yield and the rate of change of the degree of yield.

It is therefore the object of this invention to provide apparatus for plotting a curve between stress, or load, and degree of yield, or stroke, of a structure such as an aircraft landing gear. It is a further object of the invention to provide the resulting curve with time markings to permit the rate of change of stroke, which gives the acceleration or deceleration of the load, to be computed.

Briefly this is accomplished by applying a voltage proportional to the stress in the gear-structure, to the vertical deflecting means of a cathode ray tube, and by applying a voltage proportional to the stroke, to the horizontal deflecting means of the cathode ray tube, whereby the beam of the tube traces the load-stroke curve of the particular structure being tested. In order to provide a basis for computing acceleration, means are provided for applying pulses to the beam intensity control electrode of the cathode ray tube to produce breaks in the load-stroke curve having equal time intervals therebetween.

A specific embodiment of the invention will be described in connection with the accompanying drawings in which:

Fig. 2 shows a schematic diagram of the indicator circuit, and

Figure 1:
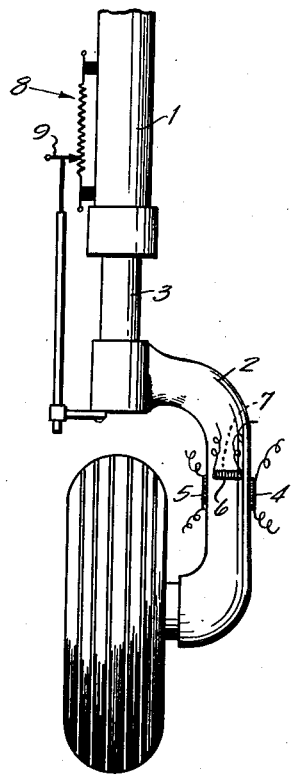
Fig. 1 shows a typical landing gear to be tested.

Referring to Fig. 1 the nose landing gear illustrated comprises a tubular strut 1, which is rigidly fixed to the nose of the aircraft, and a wheel supporting structure 2 having a plunger 3 slidably mounted in the strut 1. The motion of wheel support structure 2 and plunger 3 relative to the strut 1 is controlled by the action of a hydraulic shock absorber located in the strut 1. The details of this shock absorber form no part of the invention, however, such a shock absorber would usually comprise a cylinder attached to the strut 1 and a piston attached to the plunger 3 with the upper end of the cylinder provided with an air space, the compression of the air in which provides the necessary cushioning effect in landing.

In order to determine the axial load on the gear the strain gauges 4 and 5 are positioned on opposite sides of the member 2 as shown. When a load is transmitted to the gear through the landing wheel a slight bending of the member 2 takes place, which causes the strain gauge 4 to be placed in tension and strain gauge 5 to be placed in compression. These strain gauges are of the type in which the resistance varies with the stress applied to the gauge, equal amounts of tension and compression causing the resistances of the gauges to vary by equal amounts and in opposite directions. Dummy gauges 6 and 7, the latter located on the back of structure 2 are for temperature compensation and are so mounted that the load on the landing gear will produce no resistance change therein. A potentiometer comprising a resistance element 8 insulatedly mounted on strut 1 and a sliding element 9 rigidly attached to the wheel supporting structure 2, is provided for producing a voltage proportional to the stroke of the gear as will be described later.

Fig. 2 shows the indicator circuit in which the strain gauges and the potentiometer of Fig. 1 are connected. The gauges 4, 5, 6 and 7 form the legs of a Wheatstone bridge. A source of direct potential is applied between points 10 and 11 and a meter 14 is connected between points 12 and 13. Variable resistors 15, 16 and 17 are provided for initial balance adjustment of the bridge. The bridge may be initially balanced by adjusting resistors 15, 16 and 17 until zero reading is obtained on the meter 14. For final accurate adjustment the sensitivity of the meter may be increased by the depressing switch 18 to remove the meter shunt. As previously explained a load applied to the landing gear causes the resistances of strain gauges 4 and 5 to vary in opposite directions and to unbalance the bridge causing a voltage to appear between terminals 12 and 13 that is proportional to the bending of member 2 (Fig. 1) and therefore to the load on the landing gear. Since dummy gauges 6 and 7 are subjected to the same temperature change as active gauges 4 and 5 the effect of temperature change on the output of the bridge for a given load is largely compensated.

The output of the bridge is applied to a three-stage direct current amplifier comprising amplifier tubes 19, 21 and 22. The voltage to be amplified is applied between the grid and cathode of tube 19. The plate-cathode impedance of screen grid tube 20 serves as the load impedance for tube 19 and the amplified voltage developed thereacross is applied to the grid of amplifier tube 21 through gaseous discharge tube 42. The stages comprising tubes 21 and 22 are identical in all respects to the stage just described. The output voltage from tube 22 is applied across resistor 23 to the vertical reflecting plate 24 of the cathode ray tube 25. A dual potentiometer arrangement comprising resistor 26 and 27 and adjustable contacts 28 and 29 is provided between the vertical deflecting plate 24 and the vertical deflecting plate 30 for adjusting the direct potential between these electrodes from a value of zero to a maximum value of either polarity, for centering the cathode ray tube beam along the vertical axis. With this arrangement the beam of the tube is deflected vertically from its zero position by an amount proportional to the output voltage of the bridge, which is in turn proportional to the load on the landing gear.

In order to produce horizontal deflection of the cathode ray tube beam proportional to the stroke of the landing gear the resistance 8, which is mounted on the member 1 in Fig. 1, is connected in series with an adjustable resistor 43 across the source of direct potential 31. The voltage between slider 9, which is mounted on member 2 in Fig. 1, and ground, when resistor 8 is uniform, is therefore proportional to the stroke of the landing gear. The resistor 8 in this case may conveniently be a slide wire made of a material having fairly high resistance. The voltage difference between slider 9 and ground is amplified by a two-stage direct current amplifier comprising amplifier tubes 32 and 33, each of the stages containing these tubes being identical to the stages in the above described amplifier used with the bridge. The output voltage from tube 33 is applied across resistor 34 to the horizontal deflecting plate 35 of the cathode ray tube 25. A dual potentiometer arrangement identical to that used between deflecting plates 24 and 30 is used between horizontal deflecting plates 35 and 36 to adjust the zero position of the beam along the horizontal axis.

In order to produce time markings on the load-stroke curve produced by the above described circuit, a pulse generator 38, which may be a sine wave oscillator is provided. The beam intensity control electrode 37 is negatively biased by means of voltage source 39 acting through resistor 40, across which the output voltage of oscillator 38 is developed. By proper choice of the voltages of the output of oscillator 38 and of source 39 the tube may be biased beyond the cut-off point for a portion of each cycle of the sine wave applied to grid 37, the ratio of the time during which the beam is on to the time during which it is cut off may be varied by varying the voltage of source 39. Other forms of oscillators, such as a multivibrator, may be used at 38.

Figure 3:
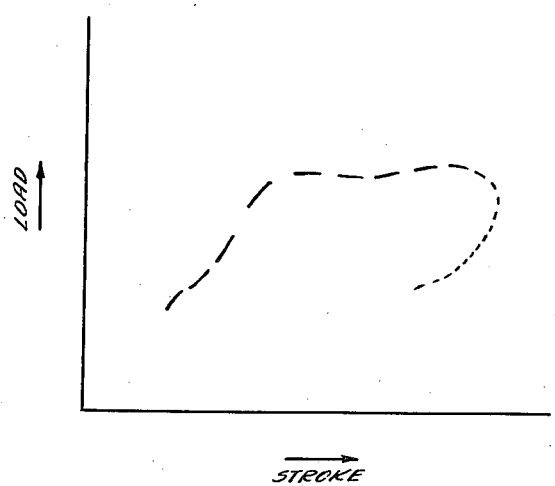
Fig. 3 shows a typical load-stroke curve produced by the indicator.

A typical curve produced by the apparatus is shown in Fig. 3. Since the curve is only traced once for each test of the gear a suitable means of recording the curve for later observation is of course necessary. This may be accomplished by photographing the curve, or else a storage type cathode-ray tube may be used.

I claim as my invention:

1. A device for plotting the load-stroke curve of a yieldable load carrying structure such as an aircraft landing gear, said device comprising a cathode-ray tube, means comprising a strain gauge mounted on said structure for producing a voltage proportional to the load on said structure, means for applying said load proportional voltage to the vertical beam deflecting means of said cathode-ray tube, a potentiometer having a uniform resistance element and a contact movable therealong, means for mounting said resistance element and said movable contact on parts of said structure having relative movement therebetween due to yielding of said structure, means for applying a direct voltage across said resistance element whereby a voltage is developed at said movable contact that is proportional to the degree of yield of said structure, means for applying a voltage proportional to said last named voltage to the horizontal beam deflecting means of said cathode-ray tube, a beam intensity control electrode in said cathode-ray tube, means for applying a negative bias to said electrode, an oscillator, means for applying the alternating voltage generated by said oscillator to said electrode, the values of said bias voltage and said alternating voltage being such that the beam of said cathode-ray tube is turned on for a portion of each cycle of said alternating voltage.

2. A device for plotting the load-stroke curve of a yieldable load carrying structure such as an aircraft landing gear, said device comprising a cathode-ray tube, means comprising a strain gauge mounted on said structure for producing a voltage proportional to the load on said structure, a direct current amplifier, means for applying said voltage to the input of said amplifier, said amplifier comprising a plurality of cascade connected stages, each of said stages having a direct current connection from the anode of the amplifier tube in said stage through a gaseous discharge tube to the grid of the amplifier tube in the next succeeding stage, and a connection from the anode of the amplifier tube in each stage to the cathode of a high plate impedance tube the anode of which is connected to a source of positive potential, whereby said high impedance tube operates as a load impedance for said amplifier tube, means for applying the output voltage of the last stage of said direct current amplifier to the vertical deflecting means of said cathode-ray tube, a potentiometer having a uniform resistance element and a contact movable therealong, means for mounting said resistance element and said movable contact on parts of said structure having relative movement therebetween due to yielding of said structure, means for applying a direct voltage across said resistance element whereby a voltage is developed at said movable contact that is proportional to the degree of yield of said structure, a second direct current amplifier similar to said first mentioned amplifier, means for applying the voltage at said movable contact to the input of said second direct current amplifier, means for applying the output voltage of said second direct current amplifier to the horizontal deflecting means of said cathode-ray tube, a beam intensity control electrode in said cathode-ray tube, means for applying a negative bias to said electrode, a sine wave oscillator, means for applying the alternating voltage generated by said oscillator to said electrode, the values of said bias voltage and said alternating voltage being such that the beam of said cathode-ray tube is turned on for a portion of each cycle of said alternating voltage.

HAROLD B. KING.

REFERENCES CITED

The following references are of record in the file of this patent:

UNITED STATES PATENTS

| Number | Name | Date |
| --- | --- | --- |
| 2,373,504 | Schlieben et al. | Apr. 10, 1945 |
| 2,423,867 | Zener et al. | July 15, 1947 |
| 2,443,045 | Magruder et al. | June 8, 1948 |